US012470650B2

(12) United States Patent
Chen

(10) Patent No.: US 12,470,650 B2
(45) Date of Patent: Nov. 11, 2025

(54) VOICE CALL METHOD AND APPARATUS, TERMINAL, AND STORAGE MEDIUM

(71) Applicant: GUANGDONG OPPO MOBILE TELECOMMUNICATIONS CORP., LTD., Dongguan (CN)

(72) Inventor: Biao Chen, Dongguan (CN)

(73) Assignee: GUANGDONG OPPO MOBILE TELECOMMUNICATIONS CORP. LTD., Guangdong (CN)

(*) Notice: Subject to any disclaimer, the term of this patent is extended or adjusted under 35 U.S.C. 154(b) by 485 days.

(21) Appl. No.: 17/991,559

(22) Filed: Nov. 21, 2022

(65) Prior Publication Data

US 2023/0095163 A1 Mar. 30, 2023

Related U.S. Application Data

(63) Continuation of application No. PCT/CN2021/089320, filed on Apr. 23, 2021.

(30) Foreign Application Priority Data

May 26, 2020 (CN) .......................... 202010454069.7

(51) Int. Cl.
H04M 1/00 (2006.01)
G06T 7/70 (2017.01)
(Continued)

(52) U.S. Cl.
CPC ........... H04M 1/72448 (2021.01); G06T 7/70 (2017.01); G10L 25/51 (2013.01); H04M 1/0268 (2013.01);
(Continued)

(58) Field of Classification Search
CPC ........... H04M 1/72448; H04M 1/0268; H04M 1/0241; H04M 1/03; H04M 1/72469;
(Continued)

(56) References Cited

U.S. PATENT DOCUMENTS 6,028,556 A * 2/2000 Shiraki .................. H01Q 1/244
343/702
6,643,528 B1 11/2003 Shim et al.
(Continued)

FOREIGN PATENT DOCUMENTS

CN 102957798 A 3/2013
CN 105611014 A 5/2016
(Continued)

OTHER PUBLICATIONS

International Search Report and Written Opinion dated Jul. 28, 2021 in International Application No. PCT/CN2021/089320. English translation attached.

(Continued)

Primary Examiner — Amancio Gonzalez
(74) Attorney, Agent, or Firm — Sheppard, Mullin, Richter & Hampton LLP

(57) ABSTRACT

Provided are a voice call method, an apparatus, a terminal, and a storage medium, relating to the technical field of the terminal. The method includes: obtaining, in response to a voice call instruction, a display screen state of the flexible display screen, the display screen state comprising at least one of a roll-up state and a spread-out state; controlling, in response to the flexible display screen being in the roll-up state, the flexible display screen to spread out, wherein the first housing and the second housing move relative to each other while spreading out the flexible display screen, and wherein a distance between the sound receiving hole and a sound source after the spreading out is smaller than a distance between the sound receiving hole and the sound source before the spreading out; and collecting call voice through the radio microphone.

20 Claims, 9 Drawing Sheets

(51) Int. Cl.
*G10L 25/51* (2013.01)
*H04M 1/02* (2006.01)
*H04M 1/72448* (2021.01)
*H04R 1/02* (2006.01)
*H04R 1/04* (2006.01)
*H04R 1/08* (2006.01)
*H04R 3/00* (2006.01)
*H04R 29/00* (2006.01)

(52) U.S. Cl.
CPC ............ *H04R 1/028* (2013.01); *H04R 1/04* (2013.01); *H04R 1/08* (2013.01); *H04R 3/005* (2013.01); *H04R 29/005* (2013.01); *G06T 2207/30201* (2013.01); *H04R 2410/05* (2013.01); *H04R 2499/11* (2013.01); *H04R 2499/15* (2013.01)

(58) Field of Classification Search
CPC ... H04M 2250/52; H04M 1/0237; G06T 7/70; G06T 2207/30201; G10L 25/51; H04R 1/028; H04R 1/04; H04R 1/08; H04R 3/005; H04R 29/005; H04R 2410/05; H04R 2499/11; H04R 2499/15; G06F 1/1677; G06F 1/1684; G06F 1/1624; G06F 1/1652
USPC ........................................................ 455/456
See application file for complete search history.

(56) References Cited

U.S. PATENT DOCUMENTS

| | | | | |
|---|---|---|---|---|
| 6,980,149 B1* | 12/2005 | Meyer | ............... | H04L 67/131 345/474 |
| 7,158,083 B2* | 1/2007 | Satoh | ............... | H01Q 3/08 343/702 |
| 7,558,057 B1* | 7/2009 | Naksen | ............... | G06F 1/1613 361/679.56 |
| 7,953,464 B2* | 5/2011 | Park | ............... | H04M 1/0237 455/90.3 |
| 8,050,658 B2* | 11/2011 | Hong | ............... | H04W 12/06 455/445 |
| 8,275,420 B2* | 9/2012 | Lim | ............... | G06F 1/1652 455/566 |
| 8,463,321 B2* | 6/2013 | Yamashita | ............... | H04M 1/0241 455/575.2 |
| 8,649,825 B2* | 2/2014 | van Wonterghem | ...... | H04B 7/02 455/566 |
| 8,654,519 B2* | 2/2014 | Visser | ............... | G09F 11/30 361/679.21 |
| 8,666,446 B2* | 3/2014 | Kim | ............... | H04N 9/3194 455/566 |
| 8,738,102 B2* | 5/2014 | Ahn | ............... | H04M 1/026 455/575.4 |
| 8,947,269 B2* | 2/2015 | Jung | ............... | H01H 25/002 345/169 |
| 9,137,359 B2* | 9/2015 | Hwang | ............... | H04M 3/42 |
| 9,173,023 B2* | 10/2015 | Domingo Yaguez | .. | H04R 3/002 |
| 9,374,447 B2* | 6/2016 | Kim | ............... | H04M 1/72403 |
| 9,419,923 B2* | 8/2016 | Seo | ............... | H04L 51/04 |
| 10,304,776 B2* | 5/2019 | Kim | ............... | H10K 59/131 |
| 10,481,638 B2* | 11/2019 | Yoshizumi | ............... | G06F 1/1643 |
| 10,534,444 B2* | 1/2020 | Lin | ............... | G06F 3/0221 |
| 10,671,179 B2* | 6/2020 | Xia | ............... | G06F 3/03547 |
| 10,706,811 B2* | 7/2020 | Zhang | ............... | G09G 5/003 |
| 10,726,762 B2* | 7/2020 | An | ............... | G06F 3/0484 |
| 10,748,853 B2* | 8/2020 | Kim | ............... | H10K 77/111 |
| 10,827,620 B2* | 11/2020 | Lin | ............... | G06F 1/16 |
| 11,031,701 B2* | 6/2021 | Li | ............... | H01Q 1/08 |
| 11,032,405 B2* | 6/2021 | Lin | ............... | H04M 1/0254 |
| 11,277,503 B2* | 3/2022 | Choi | ............... | G06F 1/1652 |
| 11,507,143 B2* | 11/2022 | Kim | ............... | G06F 3/0482 |
| 11,644,692 B2* | 5/2023 | Wang | ............... | H04R 1/28 381/409 |
| 11,665,009 B2* | 5/2023 | DeLapa | ............... | H04M 3/562 709/204 |
| 11,817,097 B2* | 11/2023 | Jang | ............... | G10L 15/22 |
| 11,934,227 B2* | 3/2024 | Kim | ............... | G06F 1/1641 |
| 11,971,747 B2* | 4/2024 | Wu | ............... | G04G 17/00 |
| 12,198,678 B2* | 1/2025 | Kim | ............... | G10L 15/02 |
| 2005/0239521 A1* | 10/2005 | Harada | ............... | H04M 1/605 455/575.1 |
| 2010/0182265 A1* | 7/2010 | Kim | ............... | G06F 1/1641 345/1.3 |
| 2011/0143825 A1* | 6/2011 | Ahn | ............... | H04M 1/026 455/575.4 |
| 2014/0194165 A1 | 7/2014 | Hwang | | |
| 2015/0378557 A1* | 12/2015 | Jeong | ............... | G06F 1/1652 715/835 |
| 2018/0329514 A1 | 11/2018 | Kwon et al. | | |
| 2019/0261519 A1* | 8/2019 | Park | ............... | G06F 1/1652 |
| 2019/0317609 A1* | 10/2019 | Zhang | ............... | G06F 3/04144 |
| 2020/0264660 A1* | 8/2020 | Song | ............... | H04M 1/0241 |
| 2020/0409421 A1* | 12/2020 | Cho | ............... | G09F 9/301 |

FOREIGN PATENT DOCUMENTS

| | | |
|---|---|---|
| CN | 205281137 U | 6/2016 |
| CN | 107566660 A | 1/2018 |
| CN | 108040154 A | 5/2018 |
| CN | 107508940 B | 6/2018 |
| CN | 108259659 A | 7/2018 |
| CN | 108322592 A | 7/2018 |
| EP | 3531230 A2 | 8/2019 |
| EP | 3531230 A3 | 1/2020 |
| KR | 20010025887 A | 4/2001 |
| WO | 2016183791 A1 | 11/2016 |

OTHER PUBLICATIONS

First Office Action from corresponding Chinese Application No. 202010454069.7, dated Dec. 22, 2021. English translation attached.
The Second Office Action from corresponding Chinese Application No. 202010454069.7, dated Apr. 24, 2022. English translation attached.
Grant Notice & Supplementary Search from corresponding Chinese Application No. 202010454069.7, dated Jul. 4, 2022. English translation attached.
Extended European Search Report dated Oct. 19, 2023 received in European Patent Application No. EP21811928.7.

* cited by examiner

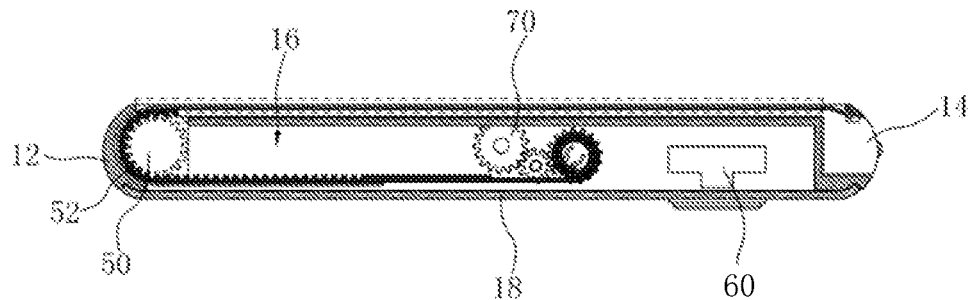

FIG. 4

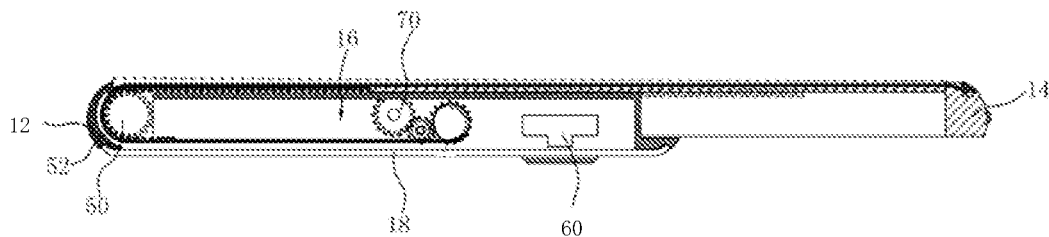

FIG. 5

| Obtaining, in response to a voice call instruction, a display screen state of the flexible display screen, the display screen state comprising at least one of a roll-up state and a spread-out state | 601 |

| Controlling, in response to the flexible display screen being in the roll-up state, the flexible display screen to spread out, wherein the first housing and the second housing move relative to each other while spreading out the flexible display screen, and wherein a distance between the sound receiving hole and a sound source after the spreading out is smaller than a distance between the sound receiving hole and the sound source before the spreading out | 602 |

| Collecting call voice through the radio microphone | 603 |

FIG. 6

VOICE CALL METHOD AND APPARATUS, TERMINAL, AND STORAGE MEDIUM

The present disclosure is a continuation of International Application No. PCT/CN2021/089320, filed on Apr. 23, 2021, which claims priority to Chinese Patent Application No. 202010454069.7, filed on May 26, 2020 and entitled "VOICE CALL METHOD AND APPARATUS, TERMINAL, AND STORAGE MEDIUM". The disclosures of the aforementioned applications are hereby incorporated by reference in their entireties.

FIELD

The embodiments of the present disclosure relate to the field of terminal technologies, and particularly, to a voice call method and apparatus, a terminal, and a storage medium.

BACKGROUND

A call function, as a basic function of a terminal, is widely used in scenarios such as audio call as well as audio and video call.

In order to achieve a better call effect, the terminal is normally provided with two microphones, i.e., a noise reduction microphone disposed at a top of the terminal, and a radio microphone disposed at a bottom of the terminal. During a call, a distance between the radio microphone and a sound source differs from that between the noise reduction microphone and the sound source. The terminal uses sound collected by the noise reduction microphone to remove noise from the sound collected by the radio microphone, thereby improving a sound reception quality.

SUMMARY

The embodiments of the present disclosure provide a voice call method, a voice call apparatus, a terminal, and a storage medium. The technical solutions are as follows.

In an aspect, the embodiments of the present disclosure provide a voice call method applied in a terminal having a flexible display screen. The terminal includes a first housing and a second housing slidably connected to the first housing. The flexible display screen has an exposed display area that is changeable through a relative movement between the second housing and the first housing. The second housing has a radio microphone. The method includes: obtaining, in response to a voice call instruction, a display screen state of the flexible display screen, the display screen state comprising at least one of a roll-up state and a spread-out state; controlling, in response to the flexible display screen being in the roll-up state, the flexible display screen to spread out, wherein the first housing and the second housing move relative to each other while spreading out the flexible display screen, and wherein a distance between the radio microphone and a sound source after the spreading out is smaller than a distance between the radio microphone and the sound source before the spreading out; and collecting call voice through the radio microphone.

In another aspect, the embodiments of the present disclosure provide a voice call apparatus applied in a terminal. The terminal has a flexible display screen. The terminal includes a first housing and a second housing slidably connected to the first housing. The flexible display screen has an exposed display area that is changeable through a relative movement between the second housing and the first housing. The second housing has a radio microphone. The apparatus includes a state obtaining module configured to obtain, in response to a voice call instruction, a display screen state of the flexible display screen, the display screen state comprising at least one of a roll-up state and a spread-out state; a control module configured to control, in response to the flexible display screen being in the roll-up state, the flexible display screen to spread out, wherein while spreading out the flexible display screen, the first housing and the second housing move relative to each other, and wherein a distance between the radio microphone and a sound source after the spreading out is smaller than a distance between the radio microphone and the sound source before the spreading out; and a voice collection module configured to collect call voice through the radio microphone.

In another aspect, the embodiments of the present disclosure provide a terminal including a first housing, a second housing, a flexible display screen, a processor; and a memory having at least one instruction stored thereon. The second housing is slidably connected to the first housing, and the second housing has a radio microphone. The flexible display screen has an exposed display area, and the exposed display area is changeable through a relative movement between the second housing and the first housing. The at least one instruction is executable by the processor to implement steps of the voice call method according to the above aspect.

In another aspect, the embodiments of the present disclosure provide a computer-readable storage medium, having at least one instruction stored thereon. The at least one instruction is executable by the processor to implement steps of the voice call method according to the above aspect.

BRIEF DESCRIPTION OF THE DRAWINGS

FIG. 4 is a schematic structural diagram illustrating a cross-section of a terminal in a roll-up state according to an embodiment of the present disclosure.

FIG. 5 is a schematic structural diagram illustrating a cross-section of a terminal in a spread-out state according to an embodiment of the present disclosure.

FIG. 6 illustrates a flowchart of a voice call method according to an embodiment of the present disclosure.

DETAILED DESCRIPTION

In order to clearly explain objectives, technical solutions, and advantages of embodiments of the present disclosure, the embodiments are further described in detail below in conjunction with the accompanying drawings.

Throughout the present disclosure, "a plurality of" refers to two or more than two; "and/or" describes an association relationship between correlated objects, including three relationships, for example, "A and/or B" indicating that only A exist, only B exists, or both A and B exist; and the symbol "/" generally indicates an "or" relationship between the correlated objects preceding and succeeding the symbol.

A voice call method provided in the embodiments of the present disclosure is applied in a terminal having a flexible display screen. A structure of the terminal is first described below.

Figure 1:
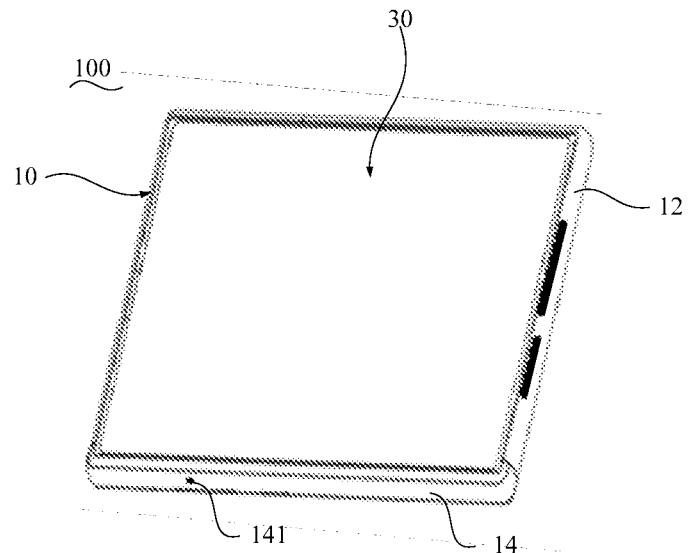
FIG. 1 is a schematic structural diagram of a terminal in a roll-up state according to an embodiment of the present disclosure.
Figure 2:
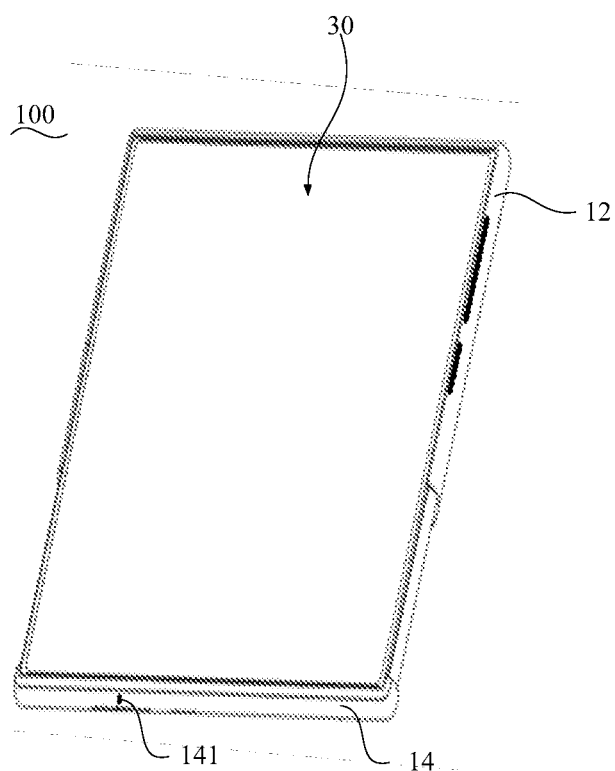
FIG. 2 is a schematic structural diagram of a terminal in a spread-out state according to an embodiment of the present disclosure.
Figure 3:
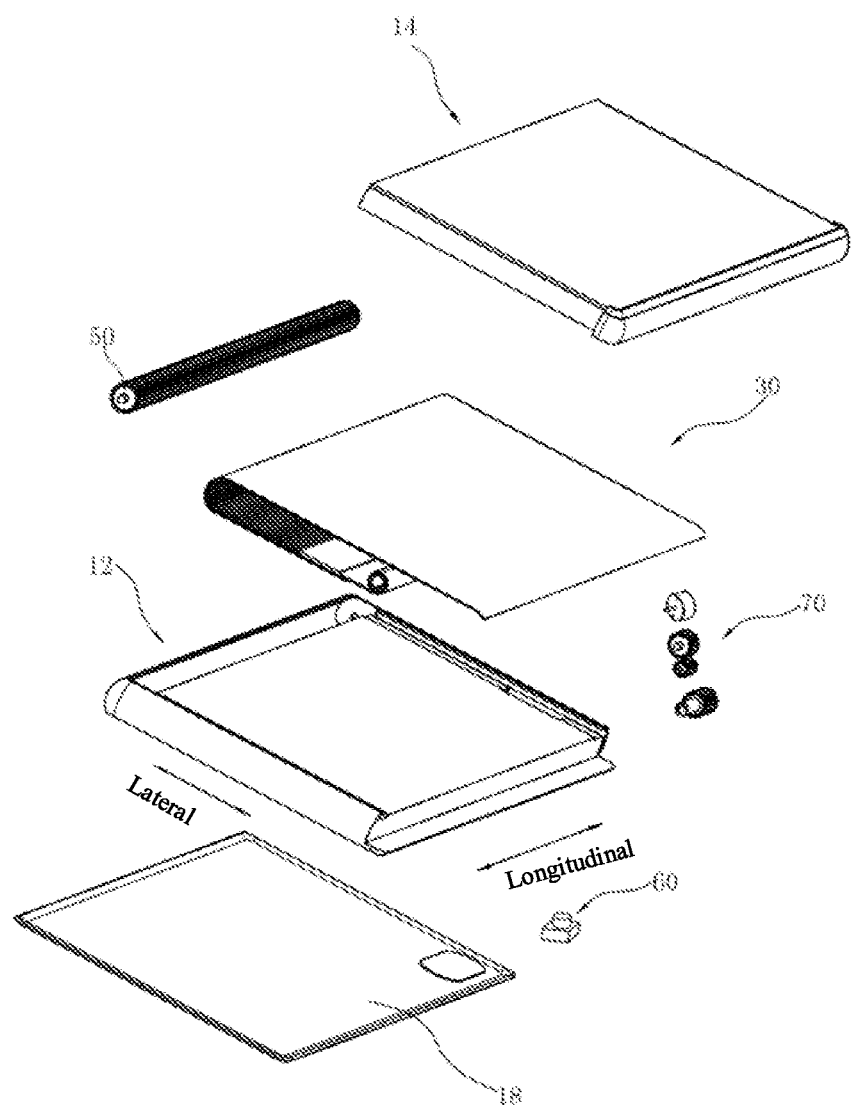
FIG. 3 is a perspective exploded view of a terminal according to an embodiment of the present disclosure.

Referring to FIG. 1 to FIG. 3, the terminal 100 in the embodiments of the present disclosure includes a housing assembly 10, a flexible display screen 30, a drive member 50, and a drive mechanism 70. The housing assembly 10 is of a hollow structure. Components such as the drive member 50, the drive mechanism 70, and a camera 60 may be disposed on the housing assembly 10. It can be understood that the terminal 100 in the embodiments of the present disclosure includes, but is not limited to, a mobile terminal such as a mobile phone, a tablet, etc., or other portable electronic devices. In the present disclosure, as an example, the terminal 100 is illustrated as a mobile phone.

In an implementation of the present disclosure, the housing assembly 10 includes a first housing 12 and a second housing 14. The first housing 12 and the second housing 14 may move relative to each other. In a possible implementation, the first housing 12 and the second housing 14 are slidably connected. That is, the second housing 14 can slide relative to the first housing 12.

In an embodiment, referring to FIG. 4 and FIG. 5, the first housing 12 and the second housing 14 together define an accommodation space 16 for accommodating components such as the drive member 50, the camera 60, and the drive mechanism 70. The housing assembly 10 may further include a rear cover 18. The accommodation space 16 is defined by the rear cover 18 together with the first housing 12 and the second housing 14.

In an embodiment, the drive member 50 is disposed in the first housing 12. One end of the flexible display screen 30 is disposed on the first housing 12. The flexible display screen 30 bypasses the drive member 50. The other end of the flexible display screen is disposed in the accommodation space 16. In this way, a portion of the flexible display screen 30 is hidden in the accommodation space 16. The portion of the flexible display screen 30 hidden in the accommodation space 16 may not be lighted up. The first housing 12 and the second housing 14 may move away from each other, and thus the flexible display screen 30 can be driven by the drive member 50 to expand, thereby allowing greater flexible display screen 30 to be exposed outside the accommodation space 16. The flexible display screen 30 exposed outside the accommodation space 16 is lighted up, to increase a display area presented by the terminal 100.

In an embodiment, as illustrated in FIG. 1 or FIG. 2, the second housing 14 further has a sound receiving hole 141 corresponding to a radio microphone (i.e., disposed on a bottom frame of the terminal). During a call, voice is transmitted to the radio microphone through the sound receiving hole 141. In an embodiment, the first housing 12 further has a noise reduction hole corresponding to a noise reduction microphone (that is, disposed on a top frame of the terminal). During a call, ambient sound is transmitted to the noise reduction microphone through the noise reduction hole, so that the terminal can perform a noise reduction processing for the voice based on the ambient sound.

In an embodiment, the drive member 50 is a rotating shaft structure with external teeth 52. The flexible display screen 30 is linked to the drive member 50 in a meshing manner. When the first housing 12 and the second housing 14 move away from each other, the portion of the flexible display screen 30 engaged on the drive member 50 is driven by the drive member 50 to move and expand.

It can be understood that the drive member 50 may also be a cylinder shaft with no teeth 52. When the first housing 12 and the second housing 14 move away from each other, the portion of the flexible display screen 30 wound on the drive member 50 is expanded by the drive member 50, to expose a larger flexible display screen outside the accommodation space 16, and thus the flexible display screen is in a flat state. In an embodiment, the drive member 50 is rotatably disposed on the first housing 12. During a gradual expanding of the flexible display screen 30, the drive member 50 may rotate along with movement of the flexible display screen 30. In other embodiments, the drive member 50 may be fixed on the first housing 12 and has a smooth surface. During the expanding of the flexible display screen 30, the drive member 50, via its the smooth surface, is in slidable contact with the flexible display screen 30.

When the first housing 12 and the second housing 14 move close to each other, the flexible display screen can be driven to roll up by the drive member 50. In an embodiment, the terminal 100 may further include a reset member (not shown). One end of the flexible display screen accommodated in the accommodation space 16 is linked with the reset member. When the first housing 12 and the second housing 14 move close to each other, the reset member drives the flexible display screen 30 to reset, to roll up the portion of the flexible display screen into the accommodation space 16.

In the embodiments of the present disclosure, the drive mechanism 70 may be disposed in the accommodation space 16, and the drive mechanism 70 may be linked with the second housing 14. The drive mechanism 70 is configured to drive the second housing 14 to move away from the first housing 12, thereby driving the flexible display screen 30 to expand. It can be understood that the drive mechanism 70 may be omitted, and the user can directly and manually move the first housing and the second housing with respect to each other.

FIG. 6 illustrates a flowchart of a voice call method according to an embodiment of the present disclosure. Referring to FIG. 6, in the present embodiment, as an example, the method is performed by the terminal illustrated in FIG. 1 to FIG. 5. The process includes the following actions in blocks.

At block 601, in response to a voice call instruction, a display screen state of the flexible display screen is obtained. The display screen state includes at least one of a roll-up state and a spread-out state.

In an embodiment, the voice call instruction is an instruction triggered when a voice call is actively requested (that is, the terminal is a main calling party), or an instruction triggered when a voice call request is received (that is, the terminal is a called party).

In case of actively requesting a voice call, if the called party does not accept the voice call request, the voice call cannot be performed subsequently. Similarly, when the voice call request transmitted by the calling party is received, but not accepted (for example, hanging up), the voice call also cannot be performed subsequently. Therefore, in a possible implementation, when the voice call instruction is actively requested and the voice call is accepted, the voice call instruction is triggered; and when the voice call request is received and a request acceptance instruction is received, the voice call instruction is triggered.

In an embodiment, the voice call instruction is an instruction triggered in a call application program, or an instruction triggered in an application program having a voice call function (for example, an instant messaging application program), which is not limited in the embodiments.

For a manner of obtaining the display screen state of the flexible display screen, in a possible implementation, the terminal obtains a spread-out distance of the flexible display screen by means of a displacement sensor, and thus the display screen state of the flexible display screen is determined based on the spread-out distance.

In an embodiment, when the spread-out distance of the flexible display screen is smaller than a first distance threshold, the terminal determines that the flexible display screen is in the roll-up state. When the spread-out distance of the flexible display screen is greater than or equal to a first distance, the terminal determines that the flexible display screen is in the spread-out state. The first distance threshold is smaller than or equal to a maximum spread-out distance of the flexible display screen.

For example, the minimum size of an exposed display area of the flexible display screen is 7×7 cm, and the maximum size is 7×14 cm, such that the maximum spread-out distance is 7 cm. When the spread-out distance of the flexible display screen is smaller than 7 cm (that is, the exposed display area is smaller than 7×14 cm), the flexible display screen is in the roll-up state. When the spread-out distance of the flexible display screen is equal to 7 cm (that is, the exposed display area is equal to 7×14 cm), the flexible display screen is in the spread-out state.

In addition to the above-mentioned manner for obtaining the display screen state of the flexible display screen, the terminal may obtain the display screen state in other manners, for example, obtaining the display screen state through a mechanical structure connected to the flexible display screen, which is not limited in the embodiments.

At block 602, in response to the flexible display screen being in the roll-up state, the flexible display screen is controlled to spread out. While spreading out the flexible display screen, the first housing and the second housing move relative to each other. A distance between the sound receiving hole and a sound source after the spreading out is smaller than a distance between the sound receiving hole and the sound source before the spreading out.

In some embodiments, as illustrated in FIG. 1 and FIG. 2, a receiver is disposed at a top of the terminal. The radio microphone is disposed at a bottom of the terminal. A width of the flexible display screen is constant. A height of the flexible display screen may vary by spreading out or rolling up. In the roll-up state (as illustrated in FIG. 1), a height of the terminal according to the embodiments of the present disclosure is smaller than a height of a conventional terminal. When the terminal is used to perform the voice call, a distance between the sound receiving hole corresponding to the radio microphone and the sound source (that is, the user's mouth) is relatively great, thereby resulting in poor sound reception quality of the radio microphone and affecting a call quality of the voice call.

In order to improve the call quality of the voice call, in one possible implementation, during a voice call, the terminal controls the flexible display screen to spread out (i.e., the portion of the flexible display screen hidden in an accommodation control is expanded and exposed outside the accommodation space). In this way, the flexible display screen is in the spread-out state after being spread out. While spreading out the flexible display screen, the first housing and the second housing may move relative to each other, to reduce a distance between the sound receiving hole arranged on the second housing and the sound source. Thus, the sound reception quality of the radio microphone can be improved, and the call quality of the voice call can be further improved.

Figure 7:
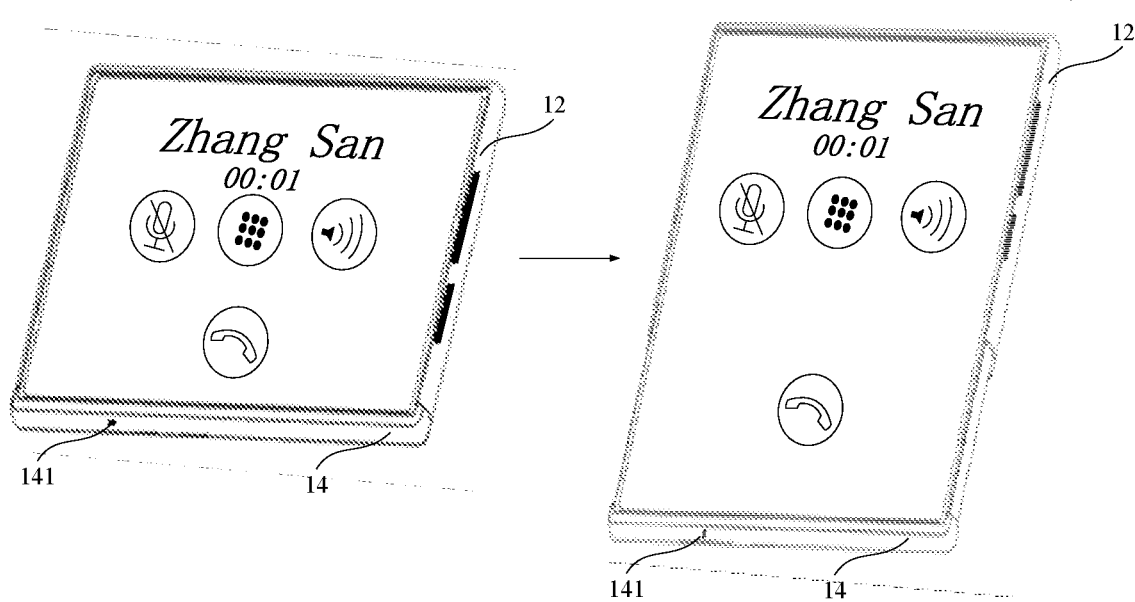
FIG. 7 is a schematic diagram of implementing the voice call method illustrated in FIG. 6 according to an embodiment of the present disclosure.

In an embodiment, the terminal controls the flexible display screen to spread out to the maximum size. For example, as illustrated in FIG. 7, during a call, the terminal controls the flexible display screen to spread out from the minimum size to the maximum size. Correspondingly, the first housing 12 and the second housing 14 move away from each other, and thus the sound receiving hole 141 disposed on the second housing 14 can be closer to the sound source.

In a possible implementation, when it is detected that the flexible display screen is in the roll-up state, the terminal automatically controls the flexible display screen to spread out. In an embodiment, when it is detected that the flexible display screen is in the roll-up state and a spreading out instruction is received, the terminal automatically controls the flexible display screen to spread out. The spreading out instruction is triggered by a specified gesture (for example, tapping the housing for a predetermined number of times), or it is triggered by voice or by means of a button (a physical button or a virtual button), which is not limited in the present embodiment.

At block 603, call voice is collected through the radio microphone.

After the spreading out of the flexible display screen is finished, the terminal collects the call voice through the radio microphone, and transmits the collected call voice to the calling party at the opposite end. In an embodiment, the terminal is further provided with the noise reduction microphone. Before transmitting the call voice, the terminal performs the noise reduction processing on the call voice based on the ambient sound collected by the noise reduction microphone, thereby improving the call quality.

In conclusion, in the embodiments of the present disclosure, the terminal has the flexible display screen, and the exposed display area of the flexible display screen can vary by controlling the relative movement between the two parts of the housing of the terminal. Thus, when the voice call instruction is received and the flexible display screen is in the roll-up state, the terminal controls the flexible display screen to spread out, such that the sound receiving hole located on the second housing can be closer to the sound source. In this way, the sound reception quality of the radio microphone can be improved, and the call quality can be further improved during the voice call using the terminal.

In a possible implementation, said controlling, in response to the flexible display screen being in the roll-up state, the flexible display screen to spread out includes: controlling, in response to the flexible display screen being in the roll-up state and a current call posture being a predetermined call posture, the flexible display screen to spread out. The predetermined call posture refers to a posture during a voice call conducted through a receiver and the radio microphone.

In a possible implementation, the method further includes: obtaining a current call mode and a sensor value outputted by a distance sensor, the distance sensor being located on a same side as the receiver; and determining, when the current call mode is neither a hands-free mode nor an earphone mode, and when the sensor value is smaller than a threshold, that the current call posture is the predetermined call posture.

In a possible implementation, said controlling the flexible display screen to spread out includes: determining a spread-out distance of the flexible display screen; generating, based on the spread-out distance, a spreading out instruction; and transmitting the spreading out instruction to a screen mechanical assembly configured to control, based on the spreading out instruction, the flexible display screen to spread out.

In a possible implementation, said determining the spread-out distance of the flexible display screen includes: obtaining a current screen length of the flexible display screen in the roll-up state, the current screen length being a length of the exposed display area in a direction of the relative movement of the housings; and determining, based on the current screen length and a target screen length, the spread-out distance. The target screen length is a maximum spread-out length of the flexible display screen in the direction of the relative movement of the housings, or a self-adaptive screen length smaller than or equal to the maximum spread-out length.

In a possible implementation, the target screen length is the self-adaptive screen length. In this case, the method further includes: controlling the flexible display screen to spread out from the current screen length to the maximum spread-out length; obtaining a loudness of the call voice collected by the radio microphone during the spreading out; and determining, as the self-adaptive screen length, a spread-out length corresponding to a maximum loudness.

In a possible implementation, the target screen length is the self-adaptive screen length. In this case, the method further includes: obtaining a facial image of a user; and determining the self-adaptive screen length based on a distance between a mouth and an ear in the facial image of the user.

In a possible implementation, the first housing has a noise reduction hole corresponding to a noise reduction microphone, and the target screen length is the self-adaptive screen length. In this case, the method, subsequent to said collecting the call voice through the radio microphone, further includes: determining, when spread out to the self-adaptive screen length, a microphone spacing distance between the noise reduction hole and the sound receiving hole; adjusting, based on the microphone spacing distance, a noise reduction algorithm; and performing, based on the adjusted noise reduction algorithm, a noise reduction processing on the call voice through ambient sound collected by the noise reduction microphone.

In a possible implementation, subsequent to said collecting the call voice through the radio microphone, the method further includes: controlling, in response to an end-of-call instruction, the flexible display screen to roll up, the flexible display screen being in the roll-up state after rolling up.

In a possible implementation, said controlling, in response to the end-of-call instruction, the flexible display screen to roll up includes: obtaining, in response to the end-of-call instruction, a terminal gripping posture; and controlling, in response to an automatic spreading out or rolling up being allowable under the terminal gripping posture, the flexible display screen to roll up.

Generally, the voice call may include the following three manners: 1. conducting a call by means of the radio microphone and a receiver (that is, by putting the receiver close to an ear for call); 2. conducting a call by means of the radio microphone and a loudspeaker (that is, conducting the call in a hands-free manner); and 3. conducting the call by means of an external voice device such as an external earphone. For the first call manner, the user cannot actively adjust the distance between the sound receiving hole corresponding to the radio microphone and the sound source during the call. For the second call manner, the user may shorten the distance between the sound receiving hole and the sound source by changing a posture of the terminal. For the third call manner, voice is collected through the external voice device without the help of the radio microphone. In this regard, a better voice call effect can be achieved by adopting the second and third call manners as described above, without adjusting the flexible display screen. Therefore, in order to avoid power consumption waste caused by unintentionally spreading out or rolling up the flexible display screen, the terminal can determine whether to spread out the flexible display screen based on a current call posture of the terminal.

Figure 8:
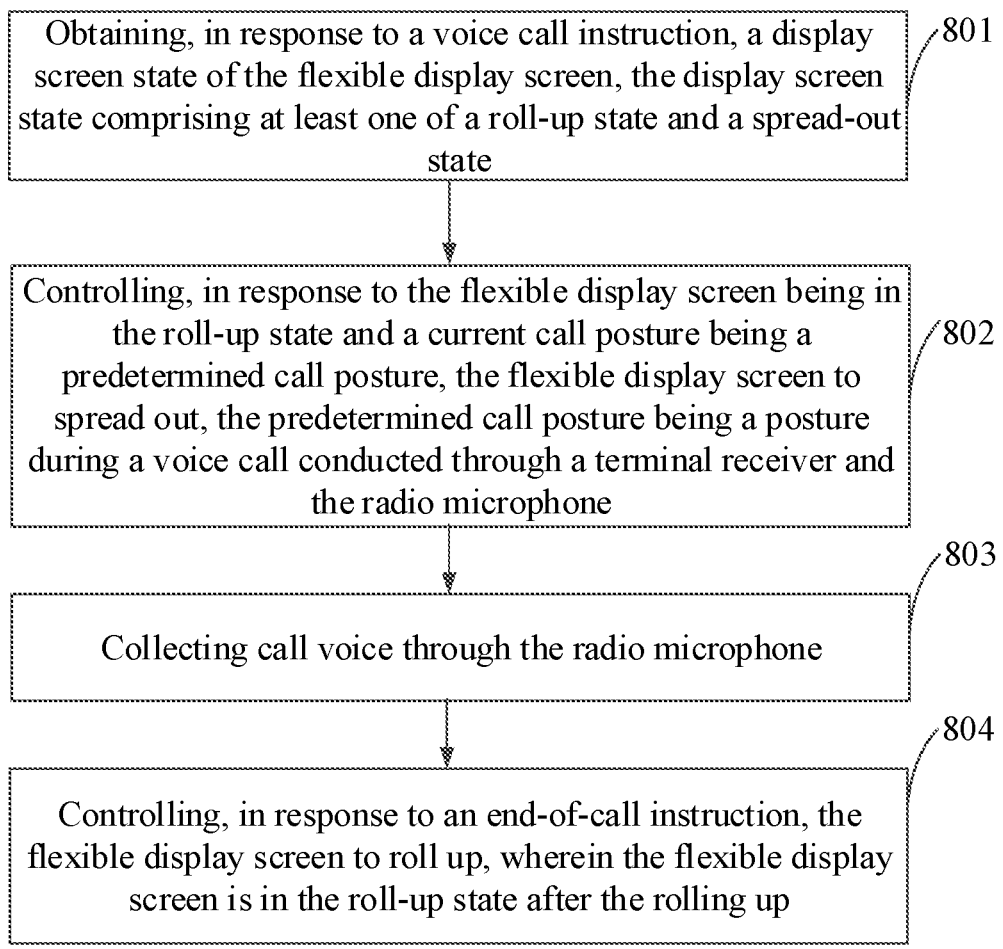
FIG. 8 illustrates a flowchart of a voice call method according to another embodiment of the present disclosure.

FIG. 8 illustrates a flowchart of a voice call method according to another embodiment of the present disclosure. Referring to FIG. 8, in the present embodiment, as an example, the method is performed by the terminal illustrated in FIG. 1 to FIG. 5. The process includes the following actions in blocks.

At block 801, in response to a voice call instruction, a display screen state of the flexible display screen is obtained. The display screen state includes at least one of a roll-up state and a spread-out state.

An implementation manner of this block may be referred to the above block 601, which is not described in detail herein.

At block 802, in response to the flexible display screen being in the roll-up state and a current call posture being a predetermined call posture, the flexible display screen is controlled to spread out. The predetermined call posture refers to a posture during a voice call conducted through a receiver and the radio microphone.

In the present embodiment, the user performs voice listening through the receiver. A call posture during the voice collection through the radio microphone is defined as the predetermined call posture. When the current call posture is the predetermined call posture, the terminal controls the flexible display screen to spread out. When the current call posture is not the predetermined call posture, the terminal maintains the flexible display screen in the current roll-up state.

In order to determine whether the current call posture is the predetermined call posture, in a possible implementation, the terminal obtains the current call mode and the sensor value outputted by the distance sensor. The distance sensor is located on the same side as the receiver. The sensor value is used to indicate a distance between the distance sensor and an upper object.

When the current call mode is neither the hands-free mode (corresponding to the second call manner as described above) nor the earphone mode (corresponding to the third call manner as described above), and when the sensor value is smaller than the threshold (for example, the sensor value is 0 and smaller than the threshold of 0.5), it indicates that the user currently puts the receiver close to the ear and the voice is collected through the radio microphone, and thus it is determined that the current call posture is the predetermined call posture.

On the contrary, when the current call mode is the hands-free mode or the earphone mode, and/or when the sensor value is greater than the threshold (indicating that an earphone receiver is not put close to the ear), the terminal determines that the current call posture is not the predetermined call posture, and thus the roll-up state is maintained.

In an embodiment, the terminal may first detect the current call mode, and further turn on the distance sensor to collect the sensor value when the current call mode meets the condition, which not limited in the embodiments.

At block 803, call voice is collected through the radio microphone.

At block 804, in response to an end-of-call instruction, the flexible display screen is controlled to roll up. The flexible display screen is in the roll-up state after rolling up.

When the voice call is ended, the terminal may further control the flexible display screen to roll up, to restore the roll-up state of the flexible display screen, thereby reducing a display power consumption of the flexible display screen.

In an embodiment, after receiving an end-of-call instruction, the flexible display screen is immediately controlled to roll up. In an embodiment, after receiving the end-of-call instruction, the terminal controls the flexible display screen to roll up after a predetermined time delay. For example, the predetermined time delay is 2 seconds.

In a possible implementation, before controlling the flexible display screen to roll up, the terminal obtains and stores an original spread-out distance of the flexible display screen. When the voice call is ended, the terminal reads the original spread-out distance, and controls the flexible display screen to roll up based on the original spread-out distance, to restore a size state of the terminal before the voice call.

Different users may have different habits of gripping the terminal during the call. If the user grips the first housing and the second housing at the same time during the call, the gripping hand may hinder a relative movement between housings when the terminal automatically controls the flexible display screen to roll up, thereby affecting the rolling up of the display screen or even causing damage to an internal electric mechanical structure. In order to avoid the above problem, in a possible implementation, in response to receiving the end-of-call instruction, the terminal obtains the terminal gripping posture; and in response to an automatic spreading out or rolling up being allowable under the terminal gripping posture, the flexible display screen is controlled to roll up. When the automatic spreading out or rolling up is unallowable under the terminal gripping posture, a prompt is triggered.

In an embodiment, a sensor is disposed at a housing edge of the first housing and the second housing (that is, constituting a middle frame of the terminal). The sensor may be at least one of a touch sensor, a pressure sensor, and a thermal sensor. The terminal determines the terminal gripping posture based on sensor data collected by the sensor.

For example, when a first housing edge and a second housing edge collect the sensor data simultaneously, the terminal determines that the automatic spreading out or rolling up is unallowable under the terminal gripping posture. When only the first housing edge or only the second housing edge collects the sensor data, the terminal determines that the automatic spreading out or rolling up is allowable under the terminal gripping posture.

The above process of determining whether the automatic spreading out or rolling up is allowable may also be applied in the process of controlling the flexible display screen to spread out, which is not limited in the present embodiment.

Figure 9:
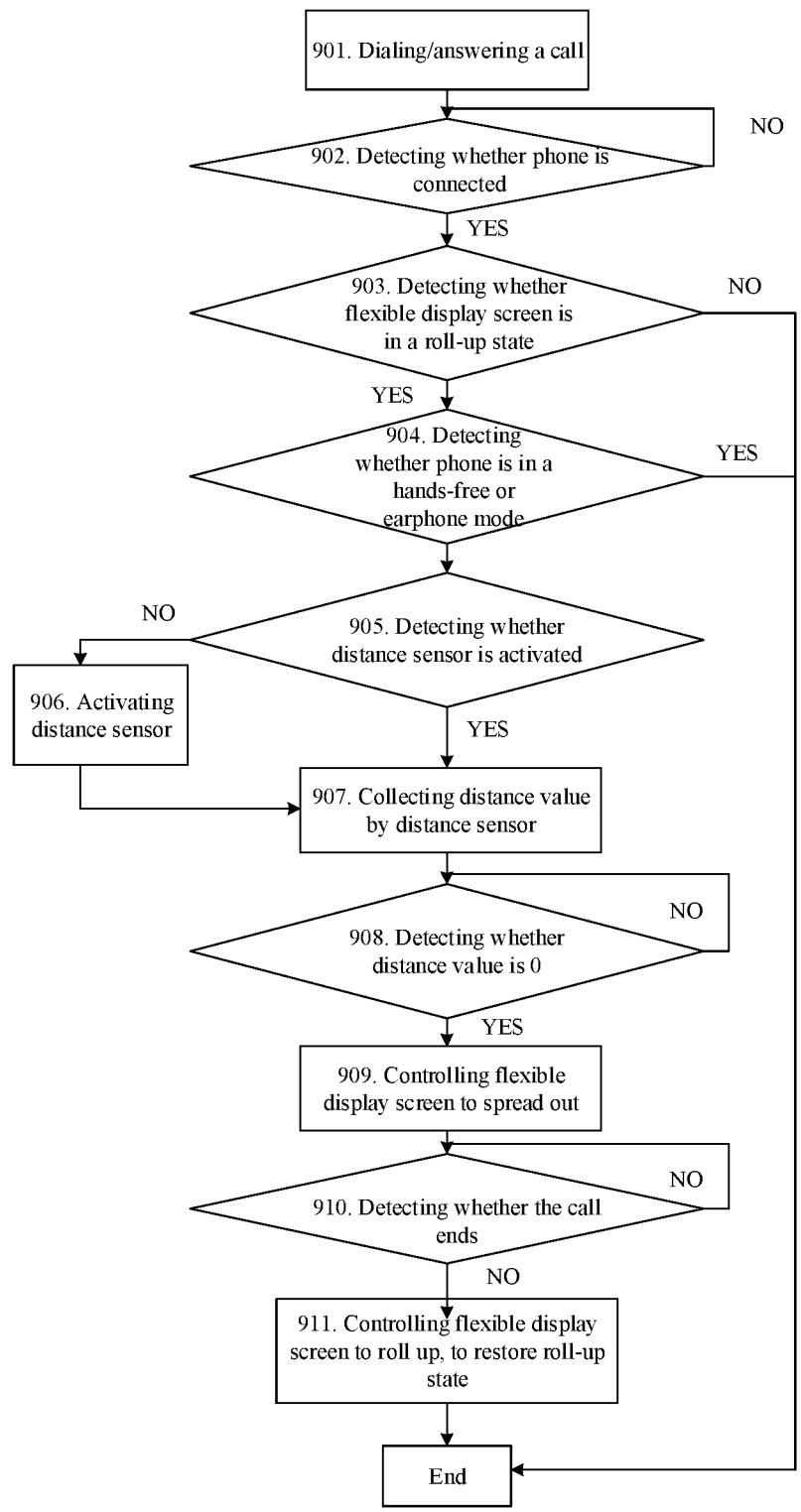
FIG. 9 is a flowchart of a voice call process according to an embodiment.

In an example, a process of performing a voice call by a terminal is illustrated in FIG. 9.

At block 901, dialing/answering a call.

At block 902, it is detected whether the phone is connected. When the phone is connected, action in block 903 is executed. When the phone is not connected, action in block 902 is loop executed.

At block 903, it is detected whether the flexible display screen is in a roll-up state. When the flexible display screen is in the roll-up state, action in block 904 is executed. When the flexible display screen is not in the roll-up state, the process ends.

At block 904, it is detected whether the phone is in a hands-free mode or an earphone mode. When the phone is neither in the hands-free mode nor in the earphone mode, action in block 905 is executed. When the phone is in the hands-free mode or the earphone mode, the process ends.

At block 905, it is detected whether a distance sensor is activated. When the distance sensor is not activated, action in block 906 is executed. When the distance sensor is activated, action in block 907 is executed.

At block 906, the distance sensor is activated.

At block 907, a distance value is collected by the distance sensor.

At block 908, it is detected whether the distance value is 0. When the distance value is 0, action in block 909 is executed. When the distance value is not 0, action in block 907 is executed again.

At block 909, the flexible display screen is controlled to spread out.

At block 910, it is detected whether the call ends. When the call ends, action in block 911 is executed. When the call does not end, action in block 910 is loop executed.

At block 911, the flexible display screen is controlled to roll up, to restore the roll-up state.

In the embodiments, the terminal determines, based on a call mode and the sensor value outputted by the distance sensor, whether the voice call shall be conducted through the receiver and the radio microphone under the current call posture. When the voice call is performed through the receiver and the radio microphone under the current call posture, the flexible display screen is controlled to spread out. When the voice call is not performed through the receiver and the radio microphone under the current call posture, the flexible display screen is maintained in the current spread-out state, to avoid the power consumption waste of the terminal caused by a useless spreading out.

In addition, in the embodiments, when the voice call is ended, the terminal can control the flexible display screen to roll up, to restore the roll-up state, thereby reducing the display power consumption of the terminal. Meanwhile, before controlling the flexible display screen to roll up, the terminal can determine, based on the gripping posture, whether the automatic spreading out or rolling up is allowable, thereby preventing the gripping hand from hindering the relative movement between the housings. Thus, security and reliability in the spreading out or rolling up process of the flexible display screen can be enhanced.

In some embodiments, the terminal may control the flexible display screen to spread out to the maximum spread-out length. However, due to the relatively great difference in face shapes of different users, there is a significant difference in the distance between the sound receiving hole of the radio microphone and the sound source. Further, different users may have significantly different voice collection effects.

In order to further improve the voice call quality, in a possible implementation, the terminal may spread out the flexible display screen to the self-adaptive screen length, such that the distance between the sound receiving hole and the sound source can be adjusted to the optimal distance, to improve a voice collection quality. This is descried in detail below in conjunction with embodiments.

Figure 10:
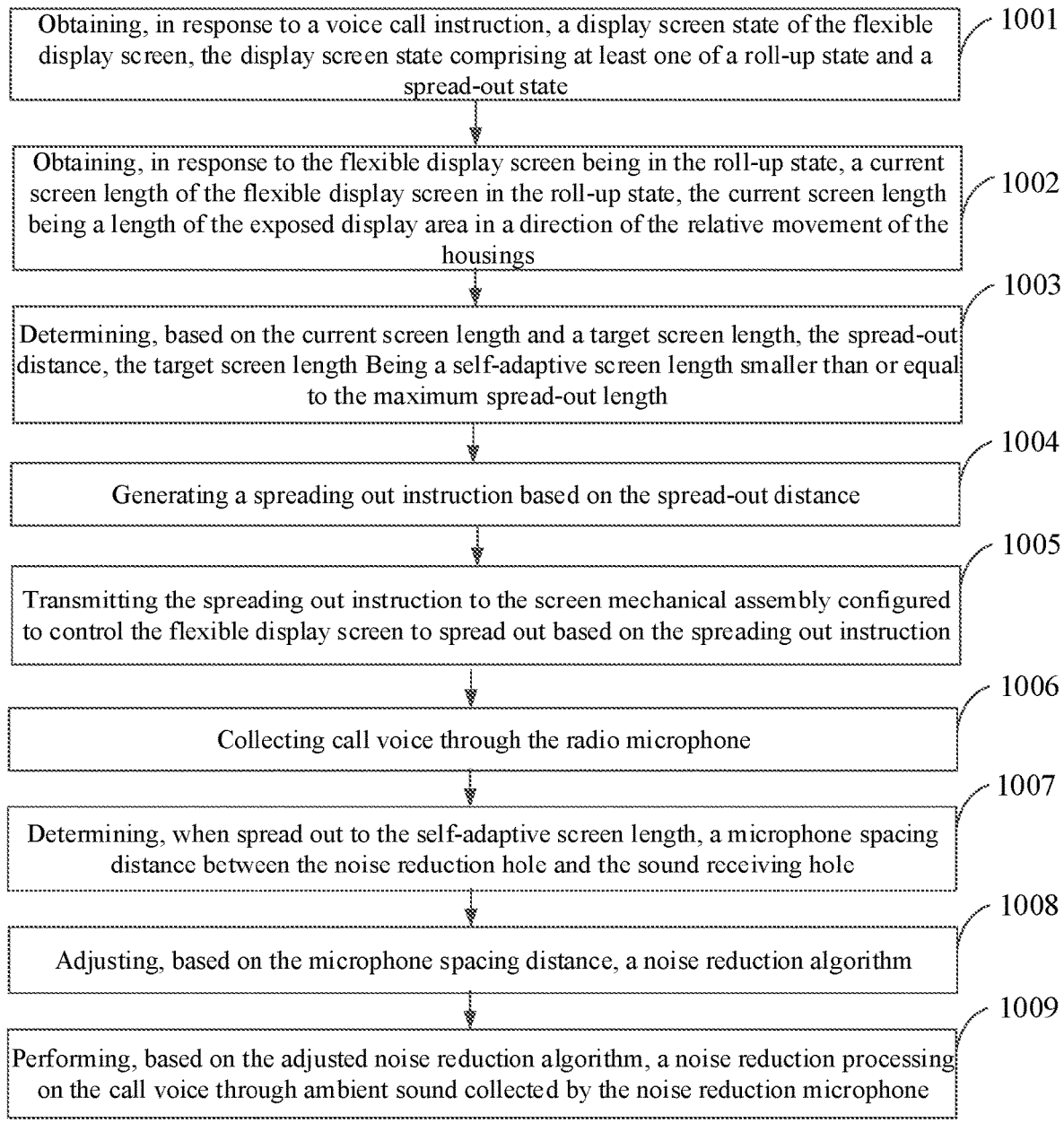
FIG. 10 illustrates a flowchart of a voice call method according to yet another embodiment of the present disclosure.

FIG. 10 illustrates a flowchart of a voice call method according to another embodiment of the present disclosure. Referring to FIG. 10, in the present embodiment, as an example, the method is performed by the terminal illustrated in FIG. 1 to FIG. 5. The process includes the following actions in blocks.

At block 1001, in response to a voice call instruction, a display screen state of the flexible display screen is obtained. The display screen state includes at least one of a roll-up state and a spread-out state.

An implementation manner of this block may be referred to the above block 601, which is not described in detail herein.

At block 1002, in response to the flexible display screen being in the roll-up state, a current screen length of the flexible display screen in the roll-up state is obtained. The current screen length is a length of the exposed display area in a direction of relative movement of the housing.

In a possible implementation, the terminal employs a displacement sensor to obtain the current spread-out distance of the flexible display screen. In this way, the current screen length is determined based on the current spread-out distance and a screen length of the minimum exposed display area of the flexible display screen in a relative movement direction (i.e., the spreading out or rolling up direction) of the housing.

In an example, the screen length of the minimum exposed display area of the flexible display screen in the spreading out or rolling up direction is 7 cm. When the current spread-out distance of the flexible display screen obtained by the displacement sensor is 1 cm, the terminal determines that the current screen length is 7+1=8 cm.

At block 1003, the spread-out distance is determined based on the current screen length and the target screen length. The target screen length is the self-adaptive screen length, which is smaller than or equal to the maximum spread-out length of the flexible display screen in the direction of the relative movement of the housing.

The spread-out distance is equal to the target screen length minus the current screen length.

In the present embodiment, the target screen length is the self-adaptive screen length. The adaptive screen length is related to a face shape of a user of the terminal. That is, different users correspond to different target screen lengths.

In a possible implementation, the self-adaptive screen length is set by the user. During a call, the terminal reads the self-adaptive screen length, and determines the spread-out distance of the flexible display screen based on the self-adaptive screen length and the current screen length. Under the self-adaptive screen length, the flexible display screen is in the spread-out state.

Since the terminal may be used by other users other than the owner, in order to adapt to the face shape of the current user of the terminal, in another possible implementation, when the terminal determines the self-adaptive screen length, the following steps may be included.

First, the flexible display screen is controlled to spread out from the current screen length to the maximum spread-out length.

In order to determine the sound reception quality of the radio microphone under respective spread-out lengths, the terminal first controls the flexible display screen to spread out to the maximum spread-out length, that is, from the current screen length to the maximum screen length.

For example, when the maximum screen length of the flexible display screen is 14 cm, and when the current screen length is 8 cm, the terminal controls the flexible display screen to gradually extend from 8 cm to 14 cm.

In a possible implementation, the terminal transmits a spreading out instruction to a screen mechanical assembly. The screen mechanical assembly can spread out the display screen with a predetermined spreading out speed based on the spreading out instruction.

Second, a loudness of call voice collected by the radio microphone is obtained during the spreading out.

In the process of spreading out the flexible display screen to the maximum spread-out length, the radio microphone may collect the call voice, while the user is speaking. Further, during the spreading out, the terminal obtains the loudness of the call voice corresponding to each spreading out position.

In a possible implementation, the terminal obtains the loudness of the call voice based on a predetermined sampling frequency, and determines the loudness of the call voice corresponding to each spreading out position based on the predetermined sampling frequency and a predetermined spreading out speed of the flexible display screen.

Third, a spread-out length corresponding to the maximum loudness is determined as the self-adaptive screen length.

Generally, the loudness is in a negative correlation with distance to the sound source (the distance between the sound receiving hole and the sound source). Therefore, in the present embodiment, the terminal determines the maximum loudness of the call voice in the spreading out process, and determines the spread-out length corresponding to the maximum loudness as the self-adaptive screen length.

For example, for a user A having a relatively short face shape, the terminal determines the self-adaptive screen length to be 12 cm, while for a user B having a relatively long face shape, the terminal determines the self-adaptive screen length to be 14 cm.

Figure 11:
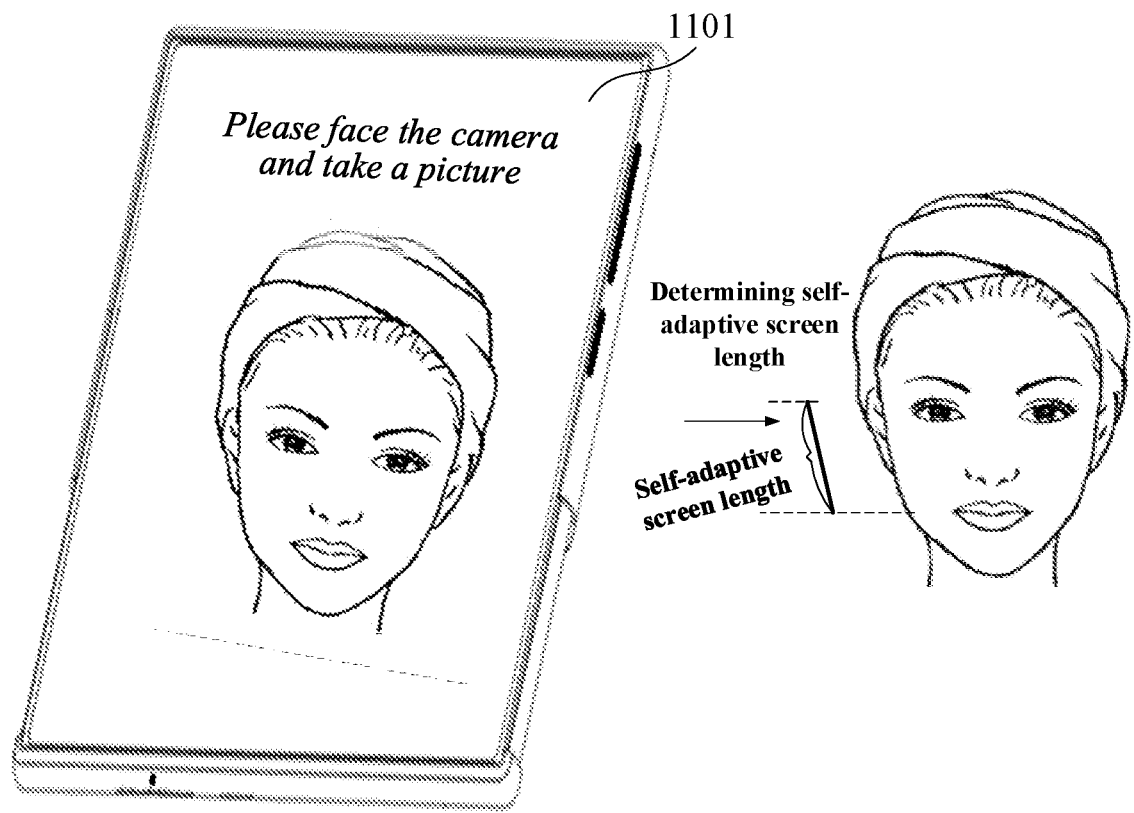
FIG. 11 is a schematic diagram illustrating a process of determining a self-adaptive screen length according to an embodiment.

In the above embodiments, as an example for illustration, the flexible display screen is controlled to spread out or roll up during the call to determine a self-adaptive screen length. In another possible implementation, the terminal obtains the facial image of the user, and determines positions of the mouth and the ear by means of facial key point positioning technique. In this way, the self-adaptive screen length can be determined based on a distance between the mouth and the ear. For example, as illustrated in FIG. 11, the terminal displays prompt information on a call setting interface 1101, to prompt the user to take a front face picture. The key point positioning is performed on the front face picture, to determine an eye position and an ear position, and thus the self-adaptive screen length with optimal call effect can be determined based on the eye position and the ear position.

In a possible implementation, in order to further improve an accuracy of the determined adaptive screen length, the terminal determines a plurality of candidate adaptive screen lengths in a plurality of call processes, and the terminal finally determines the self-adaptive screen length based on the plurality of candidate adaptive screen lengths (for example, an average value may be calculated, and the average value may be calculated after filtering), and stores the self-adaptive screen length.

At block 1004, the spreading out instruction is generated based on the spread-out distance.

In an embodiment, based on the spread-out distance, the terminal generates the spreading out instruction, which can be recognized by the screen mechanical assembly. The screen mechanical assembly may be the drive mechanism 70 illustrated in FIG. 4. The spreading out instruction may be a pulse width modulation (PWM) signal used to control rotation of a motor (belonging to the drive mechanism 70).

At block 1005, the spreading out instruction is transmitted to the screen mechanical assembly. The screen mechanical assembly is configured to control the flexible display screen to spread out based on the spreading out instruction.

Further, the terminal transmits the spreading out instruction to the screen mechanical assembly, and the screen mechanical assembly controls the flexible display screen to spread out based on the spread-out distance indicated by the spreading out instruction. In this way, a screen length of the spread-out flexible display screen is the target screen length.

At block 1006, the call voice is collected by the radio microphone.

For a conventional terminal, a noise reduction hole corresponding to the noise reduction microphone is usually provided on the top of the terminal (usually close to the top frame or the camera). During the voice call, the terminal performs the noise reduction processing on the call voice collected by the radio microphone by using the ambient sound collected by the noise reduction microphone. The noise reduction algorithm used during the noise reduction processing is predetermined.

However, for different users, the target screen length of the spread-out flexible display screen may be different. Correspondingly, a noise reduction effect is poor when a unified noise reduction algorithm is adopted to perform dual-microphone noise reduction. In order to improve the noise reduction effect, the method further includes the following steps.

At block 1007, when the flexible display screen is spread out to the self-adaptive screen length, the microphone spacing distance between the noise reduction hole and the sound receiving hole is determined.

In a possible implementation, the noise reduction hole corresponding to the noise reduction microphone is disposed on the first housing. The target screen length is the self-adaptive screen length (and smaller than the maximum spread-out length). After the self-adaptive screen length is obtained, the terminal further determines the spacing distance between the noise reduction hole and the sound receiving hole when the flexible display screen is spread out to the self-adaptive screen length. The microphone spacing distance is positively correlated with the self-adaptive screen length. That is, the longer the self-adaptive screen length is, the greater the microphone spacing distance is.

In an embodiment, the terminal stores a corresponding relationship between the screen length and the microphone spacing distance. According to the corresponding relationship, the terminal can determine the microphone spacing distance under the self-adaptive screen length.

For example, when the self-adaptive screen length is 12 cm, the terminal determines that the microphone spacing distance between the noise reduction hole and the sound receiving hole is 11 cm.

At block 1008, the noise reduction algorithm is adjusted based on the microphone spacing distance.

A dual-microphone noise reduction algorithm is determined according the following principle. That is, the distance between the radio microphone and the sound source is smaller than the distance between the noise reduction microphone and the sound source (the sound source is located at a proximal end), such that a loudness of the sound source audio collected by the radio microphone is higher than a loudness of the sound source audio collected by the noise reduction microphone. A distance between the radio microphone and a noise source is similar as a distance between the noise reduction microphone and the noise source (the noise source is located at a distal end), such that a noise interference can be reduced based on a difference between two microphone signals. In addition, a microphone signal after the noise cancellation can be intensify to improve a quality of the sound source audio.

Therefore, in a possible implementation, when the microphone spacing distance is smaller than a distance threshold (for example, 13 cm), the terminal can increase a loudness enhancement amplitude of a noise-reduced signal in the noise reduction algorithm. When the microphone spacing distance is greater than the distance threshold, the terminal can reduce the loudness enhancement amplitude of the noise-reduced signal in the noise reduction algorithm.

In other possible implementations, the terminal can store a corresponding relationship between the microphone spacing distance and the loudness enhancement amplitude, and based on the corresponding relationship, the terminal can determine a target loudness enhancement amplitude.

In addition to adjusting the loudness enhancement amplitude, the terminal may also adjust the process of obtaining the difference between the two microphone signals, which is not limited in the embodiments.

At block 1009, based on the adjusted noise reduction algorithm, the noise reduction processing is performed on the call voice through the ambient sound collected by the noise reduction microphone.

Further, based on the adjusted noise reduction algorithm, the terminal can perform the noise reduction processing on the call voice using the ambient sound collected by the noise reduction microphone, to improve a signal quality of the sound source signal.

In the present embodiment, the terminal can determine the self-adaptive screen length based on the loudness of the call voice at different spreading out positions, and the terminal can control the flexible display screen to spread out to the self-adaptive screen length. In this way, the distance between the sound receiving hole and the sound source can be the smallest, thereby improving the sound reception quality of the radio microphone.

In addition, in the present embodiment, the terminal can correspondingly adjust the dual-microphone noise reduction algorithm based on the self-adaptive screen length. Thus, the noise reduction effect can be improved during the voice call conducted by different users with the terminal, and the voice call quality can be further improved.

It should be noted that, when the target screen length in the above embodiments is the maximum spread-out length, the terminal is not required to adjust the noise reduction algorithm, which is not described in detail herein.

Figure 12:
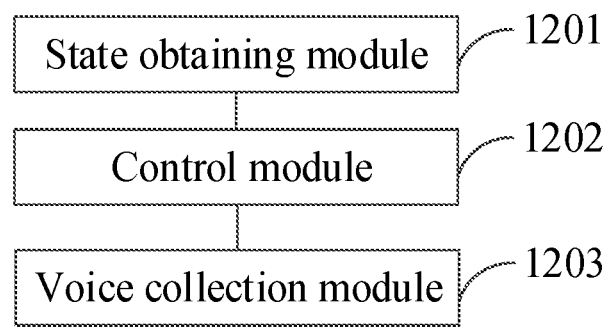
FIG. 12 illustrates a structural block diagram of a voice call apparatus according to an embodiment of the present disclosure.

FIG. 12 illustrates a structural block diagram of a voice call apparatus according to an embodiment of the present disclosure. The apparatus may be embodied as all or a part of the terminal by means of a software, a hardware, or a combination thereof. The apparatus includes a state obtaining module 1201, a control module 1202, and a voice collection module 1203.

The state obtaining module 1201 is configured to obtain, in response to a voice call instruction, a display screen state of the flexible display screen. The display screen state includes at least one of a roll-up state and a spread-out state.

The control module 1202 is configured to control, in response to the flexible display screen being in the roll-up state, the flexible display screen to spread out. While spreading out the flexible display screen, the first housing and the second housing move relative to each other. A distance between the sound receiving hole and a sound source after the spreading out is smaller than a distance between the sound receiving hole and the sound source before the spreading out.

The voice collection module 1203 is configured to collect call voice through the radio microphone.

In an embodiment, the control module 1202 is configured to control, in response to the flexible display screen being in the roll-up state and a current call posture being a predetermined call posture, the flexible display screen to spread out. The predetermined call posture refers to a posture during a voice call conducted through a receiver and the radio microphone.

In an embodiment, the apparatus further includes a posture obtaining module and a determination module. The posture obtaining module is configured to obtain a current call mode and a sensor value outputted by a distance sensor. The distance sensor is located on a same side as the receiver. The determination module is configured to determine, when the current call mode is neither a hands-free mode nor an earphone mode, and when the sensor value is smaller than a threshold, that the current call posture is the predetermined call posture.

In an embodiment, the control module 1202 includes a distance determination unit, an instruction generation unit, and an instruction transmission unit. The distance determination unit is configured to determine a spread-out distance of the flexible display screen. The instruction generation unit is configured to generate, based on the spread-out distance, a spreading out instruction. The instruction transmission unit is configured to transmit the spreading out instruction to a screen mechanical assembly. The screen mechanical assembly is configured to control, based on the spreading out instruction, the flexible display screen to spread out.

In an embodiment, the distance determination unit is configured to obtain a current screen length of the flexible display screen in the roll-up state, the current screen length being a length of the exposed display area in a direction of relative movement of the housing; and determine, based on the current screen length and a target screen length, the spread-out distance. The target screen length is a maximum spread-out length of the flexible display screen in the direction of the relative movement of the housing, or a self-adaptive screen length smaller than or equal to the maximum spread-out length.

In an embodiment, the target screen length is the self-adaptive screen length. The control module 1020 is further configured to control the flexible display screen to spread out from the current screen length to the maximum spread-out length. The apparatus further includes a loudness obtaining module and a self-adaptive length determination module. The loudness obtaining module is configured to obtain a loudness of the call voice collected by the radio microphone during the spreading out. The self-adaptive length determination module is configured to determine, as the self-adaptive screen length, a spread-out length corresponding to a maximum loudness.

In an embodiment, the target screen length is the self-adaptive screen length. The apparatus further includes an image obtaining module and a self-adaptive length determination module. The image obtaining module is configured to obtain a facial image of a user. The adaptive length determination module is configured to determine the self-adaptive screen length based on a distance between a mouth and an ear in the facial image of the user.

In an embodiment, the first housing has a noise reduction hole corresponding to a noise reduction microphone. The target screen length is the self-adaptive screen length. The apparatus further includes a spacing distance determination module, an algorithm adjustment module, and a noise reduction module. The spacing distance determination module is configured to determine, when spread out to the self-adaptive screen length, a microphone spacing distance between the noise reduction hole and the sound receiving hole. The algorithm adjustment module is configured to adjust, based on the microphone spacing distance, a noise reduction algorithm. The noise reduction module is configured to perform, based on the adjusted noise reduction algorithm, a noise reduction processing on the call voice through ambient sound collected by the noise reduction microphone.

In an embodiment, the control module 1202 is further configured to control, in response to an end-of-call instruction, the flexible display screen to roll up. The flexible display screen is in the roll-up state after the rolling up.

In an embodiment, the control module 1202 is further configured to: obtain, in response to the end-of-call instruction, a terminal gripping posture; and control, in response to an automatic spreading out or rolling up being allowable under the terminal gripping posture, the flexible display screen to roll up.

In conclusion, in the embodiments of the present disclosure, the terminal has the flexible display screen, and the exposed display area of the flexible display screen can vary by controlling the relative movement of the two parts of the housing of the terminal. Thus, when the voice call instruction is received and the flexible display screen is in the roll-up state, the terminal controls the flexible display screen to spread out, such that the sound receiving hole located on the second housing can be closer to the sound source. In this way, the sound reception quality of the radio microphone can be improved, and the call quality can be further improved during the voice call using the terminal.

In the embodiments, the terminal determines, based on the call mode and the sensor value outputted by the distance sensor, whether the voice call is performed through the receiver and the radio microphone under the current call posture. When the voice call is performed through the receiver and the radio microphone under the current call posture, the flexible display screen is controlled to spread out. When the voice call is not performed through the receiver and the radio microphone under the current call posture, the flexible display screen is maintained in the current spread-out state, to avoid the power consumption waste of the terminal caused by a useless spreading out.

In addition, in the embodiments, when the voice call is ended, the terminal can control the flexible display screen to roll up, to restore the roll-up state, thereby reducing the display power consumption of the terminal. Meanwhile, before controlling the flexible display screen to roll up, the terminal can determine, based on the gripping posture, whether the automatic spreading out or rolling up is allowable, thereby preventing the gripping hand from hindering the relative movement between the housings. Thus, security and reliability in the spreading out or rolling up process of the flexible display screen can be enhanced.

In the present embodiment, the terminal can determine the self-adaptive screen length based on the loudness of the call voice at different spreading out positions, and the terminal can control the flexible display screen to spread out to the self-adaptive screen length. In this way, the distance between the sound receiving hole and the sound source can be the smallest, thereby improving the sound reception quality of the radio microphone.

In addition, in the present embodiment, the terminal can correspondingly adjust the dual-microphone noise reduction algorithm based on the self-adaptive screen length. Thus, the noise reduction effect can be improved during the voice call conducted by different users with the terminal, and the voice call quality can be further improved.

In the above apparatus embodiments, the functions of respective modules or units can be implements in the manner as described in the above method embodiments, which is not described in detail herein.

Figure 13:
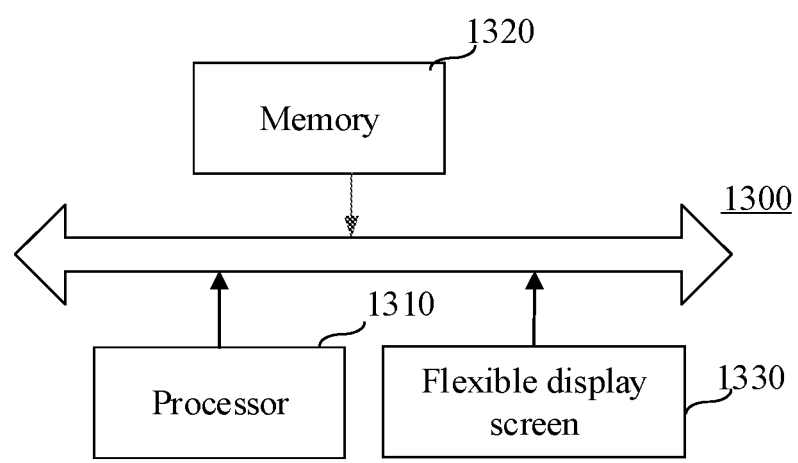
FIG. 13 illustrates a structural block diagram of a terminal according to an embodiment of the present disclosure.

FIG. 13 illustrates a structural block diagram of a terminal according to an embodiment of the present disclosure. The terminal 1300 may be a smart phone, a tablet computer, a wearable device, or the like. The terminal 1300 according to the present disclosure may include one or more of the following components: a processor 1310, a memory 1320, and a flexible display screen 1330.

The processor 1310 may include one or more processing cores. The processor 1310 connects various portions of the entire terminal 1300 by using various interfaces and lines. The processor 1310 executes various functions and processes data of the terminal 1300 by running or executing instructions, programs, code sets or instruction sets stored in the memory 1320, and invoking data stored in the memory 1320. In an embodiment, the processor 1310 may be implemented by using at least one, in a hardware form, of a Digital Signal Processing (DSP), a Field-Programmable Gate Array (FPGA), and a Programmable Logic Array (PLA). The processor 1310 may integrate one or more of a Central Processing Unit (CPU), a Graphics Processing Unit (GPU), a Neural-Network Processing Unit (NPU), and a modulator-demodulator. The CPU mainly processes an operating system, a user interface, an application program, and the like. The GPU is responsible for rendering and drawing content required to be displayed by a touch display screen 1330. The NPU is used to implement an artificial intelligence (AI) function. The modulator-demodulator is used to process wireless communication. It can be understood that the above modulator-demodulator may embodied in a separate chip, instead of being integrated in the processor 1310.

The memory 1320 may include a Random Access Memory (RAM), or may also include a Read-Only Memory (ROM). In an embodiment, the memory 1320 includes a non-transitory computer-readable storage medium. The memory 1320 may be used to store instructions, programs, codes, code sets, or instruction sets. The memory 1320 may include a storage program area and a storage data area. The storage program area may store instructions for implementing the operating system, instructions for at least one function (such as a touch function, a sound playing function, an image playing function, etc.), instructions for implementing various method embodiments described below, etc. The storage data area may store data created according to a use of the terminal 800 (such as audio data, a phone book).

The flexible display screen 1330 is used to receive a user's touch operation on or near the flexible display screen 1330 by using any suitable object such as a finger and a touch pen, and display a user interface of each application program. The flexible display screen 1330 is generally disposed on a front panel of the terminal 1300. In the embodiments of the present disclosure, the size of the exposed display area of the flexible display screen 1330 can vary with the spreading out or rolling up operation. In an embodiment, the terminal 1300 may only light up the exposed display area of the flexible display screen 1330.

In the embodiments of the present disclosure, the terminal 1300 may further include a drive member. The drive member is configured to drive the flexible display screen to expand or roll up. In an embodiment, the terminal 1300 may further include a drive mechanism. The drive mechanism is configured to drive the first housing and the second housing to move relative to each other.

In addition, those skilled in the art can understand that the structure of the terminal 1300 illustrated in the above-mentioned drawings does not constitute a limitation on the terminal 1300. The terminal may include more or fewer components than those illustrated in the drawings, or the terminal may combine some components or have different component arrangements. For example, the terminal 1300 may further include components such as a radio frequency circuit, a photographing assembly, a microphone, a receiver, a speaker, a sensor, an audio circuit, a Wireless Fidelity (WiFi) component, a power supply, and a Bluetooth component, which are not described in detail herein.

The embodiments of the present disclosure further provide a computer-readable medium. The computer-readable medium stores at least one instruction. The at least one instruction is loaded by the processor and executed to implement the voice call method described in the above embodiments.

The embodiments of the present disclosure further provide a computer program product or a computer program. The computer program product or the computer program includes a computer instruction stored in the computer-readable storage medium. A processor of a computer device reads the computer instruction from the computer-readable storage medium, and executes the computer instruction, so that the computer device performs the voice call method provided in various optional implementations of the above aspects.

Those skilled in the art should be aware that, in the above one or more examples, the functions described in the embodiments of the present disclosure may be implemented by hardware, software, firmware, or any combination thereof. When the functions are implemented by software, they may be stored in the computer-readable medium or transmitted as one or more instructions or codes on the computer-readable medium. The computer-readable medium includes a computer storage medium and a communication medium, which includes any medium facilitating the conveying of the computer program from one to another. The storage medium may be any available medium, which can be accessed by a general purpose or special purpose computer.

The above are merely several embodiments of the present disclosure, but not intended to limit the present disclosure. Any modifications, equivalent substitutions, and improvements made within the spirit and principle of the present disclosure shall be encompassed by the protection scope of the present disclosure.

What is claimed is:

1. A voice call method, applied in a terminal having a flexible display screen, the terminal comprising a first housing and a second housing slidably connected to the first housing, the flexible display screen having an exposed display area that is changeable through a relative movement between the second housing and the first housing, and the second housing having a radio microphone;

the method comprising:
obtaining, in response to a voice call instruction, a display screen state of the flexible display screen, the display screen state comprising at least one of a roll-up state and a spread-out state;
controlling, in response to the voice call instruction and the flexible display screen being in the roll-up state, the flexible display screen to spread out, wherein the first housing and the second housing move relative to each other while spreading out the flexible display screen, and wherein a distance between the radio microphone and a sound source after the spreading out of the flexible display screen is smaller than a distance between the radio microphone and the sound source before the spreading out of the flexible display screen; and
collecting call voice through the radio microphone with the flexible display screen remaining in the spread-out state during the voice call.

2. The method according to claim 1, wherein said controlling, in response to the voice call instruction and the flexible display screen being in the roll-up state, the flexible display screen to spread out comprises:
in response to the voice call instruction and the flexible display screen being in the roll-up state, determining whether a current call posture is a predetermined call posture, the predetermined call posture being a posture during a voice call conducted through a receiver and the radio microphone; and
in response to that the current call posture is the predetermined call posture, controlling the flexible display screen to spread out.

3. The method according to claim 2, wherein said determining whether the current call posture is the predetermined call posture comprises:
obtaining a current call mode and a sensor value outputted by a distance sensor, the distance sensor being located on a same side as the receiver; and
determining, in response to that the current call mode is neither a hands-free mode nor an earphone mode, and in response to that the sensor value is smaller than a threshold, that the current call posture is the predetermined call posture.

4. The method according to claim 1, wherein said controlling the flexible display screen to spread out comprises:
determining a spread-out distance of the flexible display screen;
generating, based on the spread-out distance, a spreading out instruction; and
transmitting the spreading out instruction to a screen mechanical assembly, the screen mechanical assembly being configured to control, based on the spreading out instruction, the flexible display screen to spread out.

5. The method according to claim 4, wherein said determining the spread-out distance of the flexible display screen comprises:
obtaining a current screen length of the flexible display screen in the roll-up state, wherein the current screen length is a length of the exposed display area in a direction of the relative movement of the first and second housings; and
determining, based on the current screen length and a target screen length, the spread-out distance, wherein the target screen length is a maximum spread-out length of the flexible display screen in the direction of the relative movement of the housings, or a self-adaptive screen length smaller than or equal to the maximum spread-out length.

6. The method according to claim 5, wherein the target screen length is the self-adaptive screen length; and
wherein said controlling the flexible display screen to spread out further comprises:
controlling the flexible display screen to spread out from the current screen length to the maximum spread-out length;
obtaining a loudness of the call voice collected by the radio microphone during the spreading out; and
determining, as the self-adaptive screen length, a spread-out length corresponding to a maximum loudness.

7. The method according to claim 5, wherein the target screen length is the self-adaptive screen length; and
wherein said controlling the flexible display screen to spread out further comprises:
obtaining a facial image of a user; and
determining the self-adaptive screen length based on a distance between a mouth and an ear in the facial image of the user.

8. The method according to claim 5, wherein:
the first housing has a noise reduction microphone;
the target screen length is the self-adaptive screen length; and
the method, subsequent to said collecting the call voice through the radio microphone, further comprises:
determining, in response to spreading out to the self-adaptive screen length, a microphone spacing distance between the noise reduction microphone and a sound receiving hole;
adjusting, based on the microphone spacing distance, a noise reduction algorithm; and
performing, based on the adjusted noise reduction algorithm, a noise reduction processing on the call voice through ambient sound collected by the noise reduction microphone.

9. The method according to claim 1, further comprising, subsequent to said collecting the call voice through the radio microphone:
controlling, in response to an end-of-call instruction, the flexible display screen to roll up, wherein the flexible display screen is in the roll-up state after the rolling up.

10. The method according to claim 9, wherein said controlling, in response to the end-of-call instruction, the flexible display screen to roll up comprises:
obtaining, in response to the end-of-call instruction, a terminal gripping posture; and
controlling, in response to an automatic spreading out or rolling up being allowable under the terminal gripping posture, the flexible display screen to roll up.

11. A terminal, comprising:
a first housing;
a second housing slidably connected to the first housing, the second housing having a radio microphone;
a flexible display screen having an exposed display area, the exposed display area being changeable through a relative movement between the second housing and the first housing;
a processor; and
a memory having at least one instruction stored thereon, wherein the at least one instruction is executable by the processor to implement operations comprising:

obtaining, in response to a voice call instruction, a display screen state of the flexible display screen, the display screen state comprising at least one of a roll-up state and a spread-out state;

controlling, in response to the voice call instruction and the flexible display screen being in the roll-up state, the flexible display screen to spread out, wherein the first housing and the second housing move relative to each other while spreading out the flexible display screen, and wherein a distance between the radio microphone and a sound source after the spreading out of the flexible display screen is smaller than a distance between the radio microphone and the sound source before the spreading out of the flexible display screen; and collecting call voice through the radio microphone with the flexible display screen remaining in the spread-out state during the voice call.

12. The terminal according to claim 11, wherein the second housing has a sound receiving hole, the radio microphone being disposed in the sound receiving hole.

13. The terminal according to claim 11, wherein said controlling, in response to the voice call instruction and the flexible display screen being in the roll-up state, the flexible display screen to spread out comprises:

in response to the voice call instruction and the flexible display screen being in the roll-up state, determining whether a current call posture is a predetermined call posture, the predetermined call posture being a posture during a voice call conducted through a receiver and the radio microphone; and in response to that the current call posture is the predetermined call posture, controlling the flexible display screen to spread out.

14. The terminal according to claim 11, wherein said controlling the flexible display screen to spread out comprises:

determining a spread-out distance of the flexible display screen;

generating, based on the spread-out distance, a spreading out instruction; and transmitting the spreading out instruction to a screen mechanical assembly, the screen mechanical assembly being configured to control, based on the spreading out instruction, the flexible display screen to spread out.

15. The terminal according to claim 14, wherein said determining the spread-out distance of the flexible display screen comprises:

obtaining a current screen length of the flexible display screen in the roll-up state, wherein the current screen length is a length of the exposed display area in a direction of the relative movement of the first and second housings; and determining, based on the current screen length and a target screen length, the spread-out distance, wherein the target screen length is a maximum spread-out length of the flexible display screen in the direction of the relative movement of the housings, or a self-adaptive screen length smaller than or equal to the maximum spread-out length.

16. The terminal according to claim 15, wherein the target screen length is the self-adaptive screen length; and wherein said controlling the flexible display screen to spread out further comprises:

obtaining a facial image of a user; and determining the self-adaptive screen length based on a distance between a mouth and an ear in the facial image of the user.

17. The terminal according to claim 15, wherein:

the first housing has a noise reduction microphone;

the target screen length is the self-adaptive screen length; and the operations, subsequent to said collecting the call voice through the radio microphone, further comprise:

determining, in response to spreading out to the self-adaptive screen length, a microphone spacing distance between the noise reduction microphone and a sound receiving hole;

adjusting, based on the microphone spacing distance, a noise reduction algorithm; and performing, based on the adjusted noise reduction algorithm, a noise reduction processing on the call voice through ambient sound collected by the noise reduction microphone.

18. The terminal according to claim 17, wherein the first housing has a noise reduction hole, the noise reduction microphone being disposed in the noise reduction hole.

19. The terminal according to claim 11, further comprising, subsequent to said collecting the call voice through the radio microphone:

controlling, in response to an end-of-call instruction, the flexible display screen to roll up, wherein the flexible display screen is in the roll-up state after the rolling up.

20. A non-transitory computer-readable storage medium, having at least one instruction stored thereon, wherein the at least one instruction is executable by a processor to implement operations applied in a terminal having a flexible display screen, the terminal comprising a first housing and a second housing slidably connected to the first housing, the flexible display screen having an exposed display area that is changeable through a relative movement between the second housing and the first housing, and the second housing having a radio microphone, the operations comprise:

obtaining, in response to a voice call instruction, a display screen state of the flexible display screen, the display screen state comprising at least one of a roll-up state and a spread-out state;

controlling, in response to the voice call instruction and the flexible display screen being in the roll-up state, the flexible display screen to spread out, wherein the first housing and the second housing move relative to each other while spreading out the flexible display screen, and wherein a distance between the radio microphone and a sound source after the spreading out of the flexible display screen is smaller than a distance between the radio microphone and the sound source before the spreading out of the flexible display screen; and collecting call voice through the radio microphone with the flexible display screen remaining in the spread-out state during the voice call.

\* \* \* \* \*